(12) United States Patent
Deng et al.

(10) Patent No.: US 7,539,265 B2
(45) Date of Patent: May 26, 2009

(54) MULTIPLE-INPUT MULTIPLE-OUTPUT CODE DIVISION MULTIPLE ACCESS (MIMO-CDMA) WIRELESS COMMUNICATION EQUIPMENT

(75) Inventors: Juinn-Horng Deng, Pingjhen (TW); Jeng-Kuang Hwang, Jhongli (TW); Po-Tien Lee, Rende Township, Tainan County (TW); Fu-Chin Shau, Shetou Township, Changhua County (TW)

(73) Assignee: Chung Shan Institute of Science and Technology, Armaments Bureau, M.N.D., Taoyuan (TW)

( * ) Notice: Subject to any disclaimer, the term of this patent is extended or adjusted under 35 U.S.C. 154(b) by 615 days.

(21) Appl. No.: 11/271,414

(22) Filed: Nov. 9, 2005

(65) Prior Publication Data
US 2007/0104287 A1    May 10, 2007

(51) Int. Cl.
*H04L 27/18* (2006.01)
(52) U.S. Cl. .............. 375/279; 375/299; 375/347; 455/101
(58) Field of Classification Search ........... 375/279, 375/299, 347; 455/101
See application file for complete search history.

(56) References Cited
U.S. PATENT DOCUMENTS

| | | | |
|---|---|---|---|
| 2002/0015388 A1* | 2/2002 | Kim et al. | 370/252 |
| 2004/0057530 A1* | 3/2004 | Tarokh et al. | 375/267 |
| 2005/0048933 A1* | 3/2005 | Wu et al. | 455/101 |
| 2005/0281354 A1* | 12/2005 | Kim | 375/299 |
| 2006/0159160 A1* | 7/2006 | Kim et al. | 375/148 |
| 2007/0140377 A1* | 6/2007 | Murakami et al. | 375/299 |
| 2007/0280336 A1* | 12/2007 | Zhang et al. | 375/148 |

OTHER PUBLICATIONS

Chu, "Serial concatenation of STBC or dSTBC with convolutional codes or turbo codes for space-time correlated channels", Wireless Communications and Networking Conference, 2004, vol. 3, Mar. 21-25, 2004 pp. 1764-1769 vol. 3.*

* cited by examiner

*Primary Examiner*—Juan A Torres
(74) *Attorney, Agent, or Firm*—J.C. Patents (57) ABSTRACT

A multiple-input multiple-output code division multiple access (MIMO-CDMA) wireless communication equipment has a transmitter and a receiver. The transmitter has an encoder for receiving and encoding a plurality of data, and sending the data to a quadrature phase-shift keying (QPSK) unit. The QPSK unit conducts QPSK modulating to an output of the encoder and sends it to a space-time block coding (STBC) unit or a space multiplexer to process space-time coding or space coding. A plurality of data frame generating modules generate a data frame respectively based on the output of the STBC unit, a plurality of preamble codes generated by a preamble code spreading unit, a pilot code and a cyclic prefix. The data frame is sent to the receiver via a plurality of transmitting antennas.

12 Claims, 8 Drawing Sheets

MULTIPLE-INPUT MULTIPLE-OUTPUT CODE DIVISION MULTIPLE ACCESS (MIMO-CDMA) WIRELESS COMMUNICATION EQUIPMENT

BACKGROUND OF THE INVENTION

1. Field of Invention

The present invention relates to a wireless communication equipment and pre-verifying method for software/hardware designing thereof. More particularly, the present invention relates to a MIMO-CDMA wireless communication equipment, and pre-verifying method for software/hardware design of communication system having verification of comparing the system simulation with the hardware realization.

2. Description of Related Art

The present invention relates to a wireless communication equipment and pre-verifying method for software/hardware designing thereof. More particularly, the present invention relates to a multiple-input multiple-output code division multiple access (MIMO-CDMA) wireless communication equipment, and pre-verifying method for software/hardware design of communication system having verification of comparing the system simulation with the hardware realization.

SUMMARY OF THE INVENTION

In view of the above, the present invention is directed to provide a MIMO-CDMA wireless communication equipment, which has a higher range of dynamic flexible adjustment based on the change of the environment, and provides higher power efficiency and low transmitter complexity.

Another object of the present invention is to provide a pre-verifying method for software/hardware design of communication system, to verify the correctness of the algorithm developed for communication system rapidly.

The present invention provides a MIMO-CDMA wireless communication equipment including a transmitter and a receiver. The transmitter includes an encoder for receiving and encoding a plurality of transmission data, and then sending them to a QPSK unit. The QPSK unit conducts QPSK modulating to an output of the encoder and sends it to a space-time block coding (STBC) unit to conduct space-time coding. Furthermore, a plurality of data frame generating modules generate a data frame respectively based on the output of the STBC unit, a plurality of preamble codes generated by a preamble code spreading unit, a pilot code and a cyclic prefix (CP). The data frames are sent to the receiver via a transmitting antenna respectively.

From another point of view, the present invention further provides a MIMO-CDMA wireless communication equipment including a transmitter and a receiver as the same. The transmitter also includes an encoder for receiving and encoding a plurality of transmission data, and then sending the data to a QPSK unit, except that the QPSK unit conducts QPSK modulating to an output of the encoder and sends it to a space multiplexer to conduct space coding. Then, a plurality of data frame generating modules generate a data frame respectively based on the output of the space multiplexer, a plurality of preamble codes generated by a preamble code spreading unit, a pilot code and a cyclic prefix. The data frames are also sent to the receiver via a transmitting antenna respectively.

In the embodiment of the present invention, the receiver includes a plurality of receiving antennas for receiving the data frames from each corresponding transmitting antenna respectively, and sending them correspondingly to a plurality of radio frequency units respectively, to conduct frequency reducing to the received data frames. Furthermore, a plurality of estimation modules are coupled correspondingly to the radio frequency units respectively, for estimating a time parameter, a frequency parameter and a channel parameter of the frequency reduced data frame, and removing the cyclic prefix. And a decision demodulating module receives the output of each estimation module to conduct data spreading to the data frame passed through the estimation module, so as to conduct space-time block decoding or interference eliminating, and send the data frame to a decoder to revert the original transmission data.

From another point of view, the present invention provides a pre-verifying method for software/hardware design of communication system adapted to verify the communication system having a transmitter and a receiver. The present invention includes simulating the process of sending a data frame from the transmitter to the receiver with a transceiver algorithm meeting a preset specification, so as to obtain plurality of simulation parameters; and then, planning the transmitter hardware platform to send the data frame via an antenna. The transmitter hardware platform has programs meeting the above preset specification. Furthermore, the receiver hardware platform is planned to receive the echo signal of the data frame and compare each parameter of this echo signal to the above simulation parameters. At this time, verifying the result of comparing various parameters of the above echo signal and the simulation parameters is in an desired range or not. When the result of comparing various parameters of the above echo signal and the simulation parameters is not in a desired range, the above transceiver algorithm will be adjusted. Otherwise, if the result of comparing various parameters of the above echo signal and the simulation parameters is in a desired range, the transceiver algorithm will be converted to a hardware program language format to be written in a programmable module to perform the action of the transmitter and the receiver.

Since the wireless communication equipment provided in the present invention employs the MIMO-CDMA technique, and it is a single wave time-space domain spreading technique, the signal dynamic range is not large, and the occupancy to digital/analog converter or digital/analog converter bit number is not large, therefore, a high dynamic flexible adjustment range can be obtained according to the change of the environment. Furthermore, since the single wave is not sensitive to the non-linearity of the radio frequency power amplifier, the present invention has the advantage of higher power efficiency and low transmitter complexity.

Further, the pre-verifying method provided in the present invention can verify the application of the algorithm developed for communication system correctly and rapidly, due to the practical comparison between the results from the system simulation and hardware operation.

In order to the make the aforementioned and other objects, features and advantages of the present invention apparent, the preferred embodiments in accompany with drawings is described in detail below.

DESCRIPTION OF EMBODIMENTS

Figure 1:
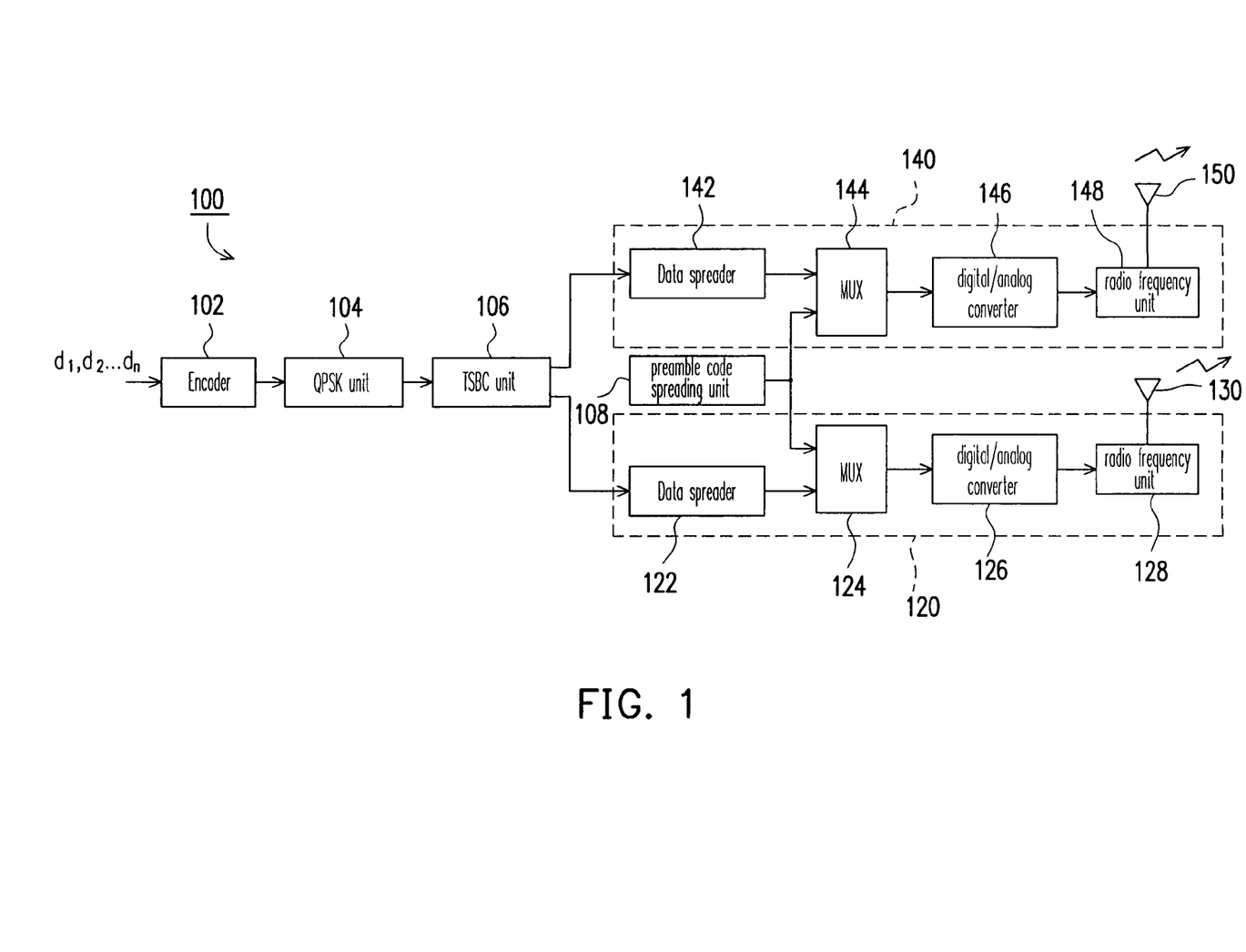
FIG. 1 is a functional block diagram of a transmitter having multi-output according to a preferred embodiment of the present invention.

FIG. 1 is a functional block diagram of a transmitter having multi-output according to a preferred embodiment of the present invention. The transmitter is adapted to a MIMO-CDMA wireless communication equipment. Referring to FIG. 1, the transmitter 100 of the present invention has an encoder 102 with its output coupled to a quadrature phase-shift keying (QPSK) unit 104. The output of the QPSK unit 104 is coupled to a space-time block coding (STBC) unit 106. In the transmitter 100, a plurality of data frame generating modules are further provided, for example, 120, 140, for receiving the outputs of the STBC unit 106 and a preamble code spreading unit 108.

Still referring to FIG. 1, the encoder 102 receives a plurality of transmission data d1, d2, . . . , dn, and encodes the data. Next, the QPSK unit 104 will conduct QPSK modulating to the output of the encoder 102 to generate a plurality of QPSK symbol, and then spread the QPSK symbol with Walsh-Hadamard Orthogonal spreading, thereby obtaining a spread code gain to be output to the STBC unit 106. After the STBC unit 106 receives the output of the QPSK unit 104, it will conduct space-time block coding to the output, which can be represented by the mathematical expression below:

$$[d_2 \quad d_1] \to \begin{bmatrix} -d_2^* & d_1 \\ d_1^* & d_2 \end{bmatrix}$$

where, d1 and d2 are all transmission data. Then, the STBC unit 106 will send the output to the data frame generating module 120 and 140 respectively.

In another alternative embodiments, the STBC unit 106 can be replaced by a space multiplexer. The space multiplexer can conduct space coding to the output of the QPSK unit 104, which can be represented by the mathematical expression below:

$$[d_2 \quad d_1] \to \begin{bmatrix} d_1 \\ d_2 \end{bmatrix}$$

Still referring to FIG. 1, the encoder 102 receives a plurality of transmission data $d_1, d_2, \ldots, d_n$, and encodes the data. Next, the QPSK unit 104 will conduct QPSK modulating to the output of the encoder 102 to generate a plurality of QPSK symbol, and then spread the QPSK symbol with Walsh-Hadamard Orthogonal spreading, thereby obtaining a spread code gain to be output to the STBC unit 106. After the STBC unit 106 receives the output of the QPSK unit 104, it will conduct space-time block coding to the output, which can be represented by the mathematical expression below:

$$[d_2 \quad d_1] \to \begin{bmatrix} -d_2^* & d_1 \\ d_1^* & d_2 \end{bmatrix}$$

where, $d_1$ and $d_2$ are all transmission data. Then, the STBC unit 106 will send the output to the data frame generating module 120 and 140 respectively.

Similarly, the data frame generating module 140 also includes a data spreader 142, a multiplexer 144, a digital/analog converter 146 and a radio frequency unit 148. The output of the radio frequency unit 148 is coupled to the transmitting antenna 150. The connection of the above means is the same as that of the data frame generating module 120. Definitely, the function and operation of each means of the data frame generating module 140 are similar to that of the data frame generating module 120. Therefore, the data frame generating module 120 will be taken as an example for illustration, and those skilled in the art will understand that the data frame generating module 140 can also be used.

For the present embodiment, when the output of the STBC unit 106 is sent to the data frame generating module 120, the data spreader 142 will spread the output of the STBC unit 106. In order to resist the influence of multi-path of the wireless channel, a pilot code is further added after a cyclic prefix (CP) similar to multiple wave orthogonal frequency division multiplexing (OFDM) is added to the output of the STBC unit 106, so as to create a payload data to the multiplexer 124.

Figure 2:
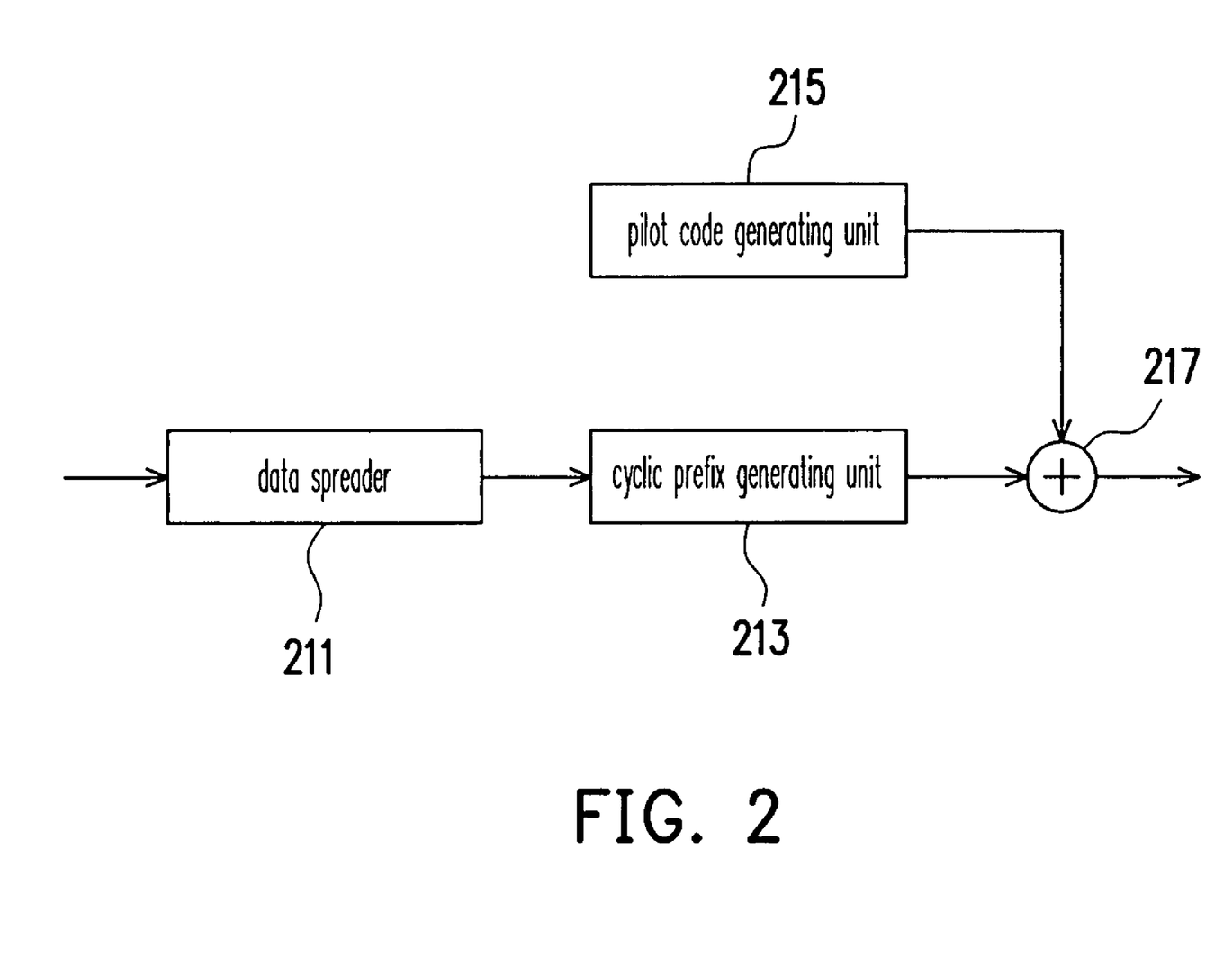
FIG. 2 is a functional block diagram of a data spreader according to a preferred embodiment of the present invention.

FIG. 2 is a functional block diagram of a data spreader according to a preferred embodiment of the present invention. Referring to FIG. 2, in the present invention, the aforementioned data spreader 122 can include, for example, a data spreading unit 211, a cyclic prefix generating unit 213, a pilot codes generating unit 215 and an adder 217.

For the present embodiment, when the output of the STBC unit 106 is sent to the data frame generating module 120, the data spreader 122 will spread the output of the STBC unit 106. In order to resist the influence of multi-path of the wireless channel, a pilot code is further added after a cyclic prefix (CP) similar to multiple wave orthogonal frequency division multiplexing (OFDM) is added to the output of the STBC unit 106, so as to create a payload data to the multiplexer 124.

Moreover, the pilot code generating unit 215 is used to generate a pilot code, and the output thereof will also coupled to the adder 217. Therefore, the adder 217 will add the output of the cyclic prefix generating unit 213 and the output of the pilot code generating unit 215 to generate a payload data.

Referring back to FIG. 1, after the multiplexer 124 receives, for example, the payload data output from the adder 217 of FIG. 2, it will generate a data frame in accompany with the preamble code spreading unit 108. The preamble codes are used fro tracing the offset of the subsequent phase shift.

Figure 3:
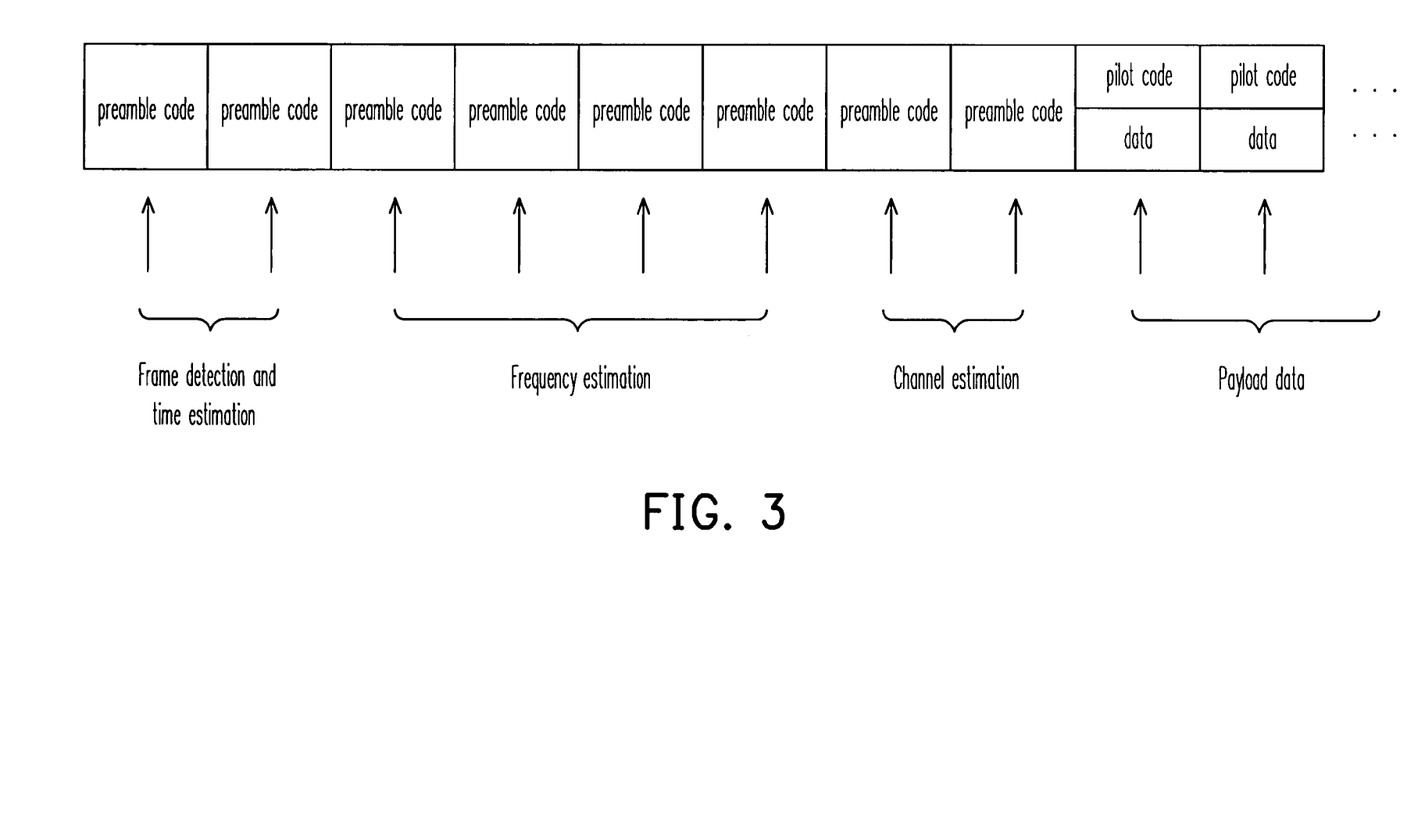
FIG. 3 is a schematic view of a data frame format according to a preferred embodiment of the present invention.

FIG. 3 is a schematic view of a data frame format according to a preferred embodiment of the present invention. Referring to FIGS. 1 and 3, in the present invention, the multiplexer 124 will firstly select the preamble codes generated by the preamble code spreading unit 108 as the output. As shown in FIG. 3, the preamble codes generated by the preamble code spreading unit 108 can be used for frame detecting, time estimation, frequency estimation, channel estimation and the like. In the present invention, the multiplexer 124 is required to output 8 preamble codes, and then switch to the data spreader 122 to output payload data. It can be seen from FIG. 3, in the payload data, a pilot code will also be added besides the received transmission data for the subsequent phase estimation and time tracing.

Referring back to FIG. 1, after the multiplexer 124 receives, for example, the payload data output from the adder 217 of FIG. 2, it will generate a data frame in accompany with the preamble code spreading unit 108. The preamble codes are used for tracing the offset of the subsequent phase shift.

Although in FIG. 1, the number of the data frame modules and the transmitting antennas is 2, it is known to those skilled in the art that the embodiment of FIG. 1 is only for illustration, and will not limit the present invention. It is similar to the receiver described below.

Figure 4:
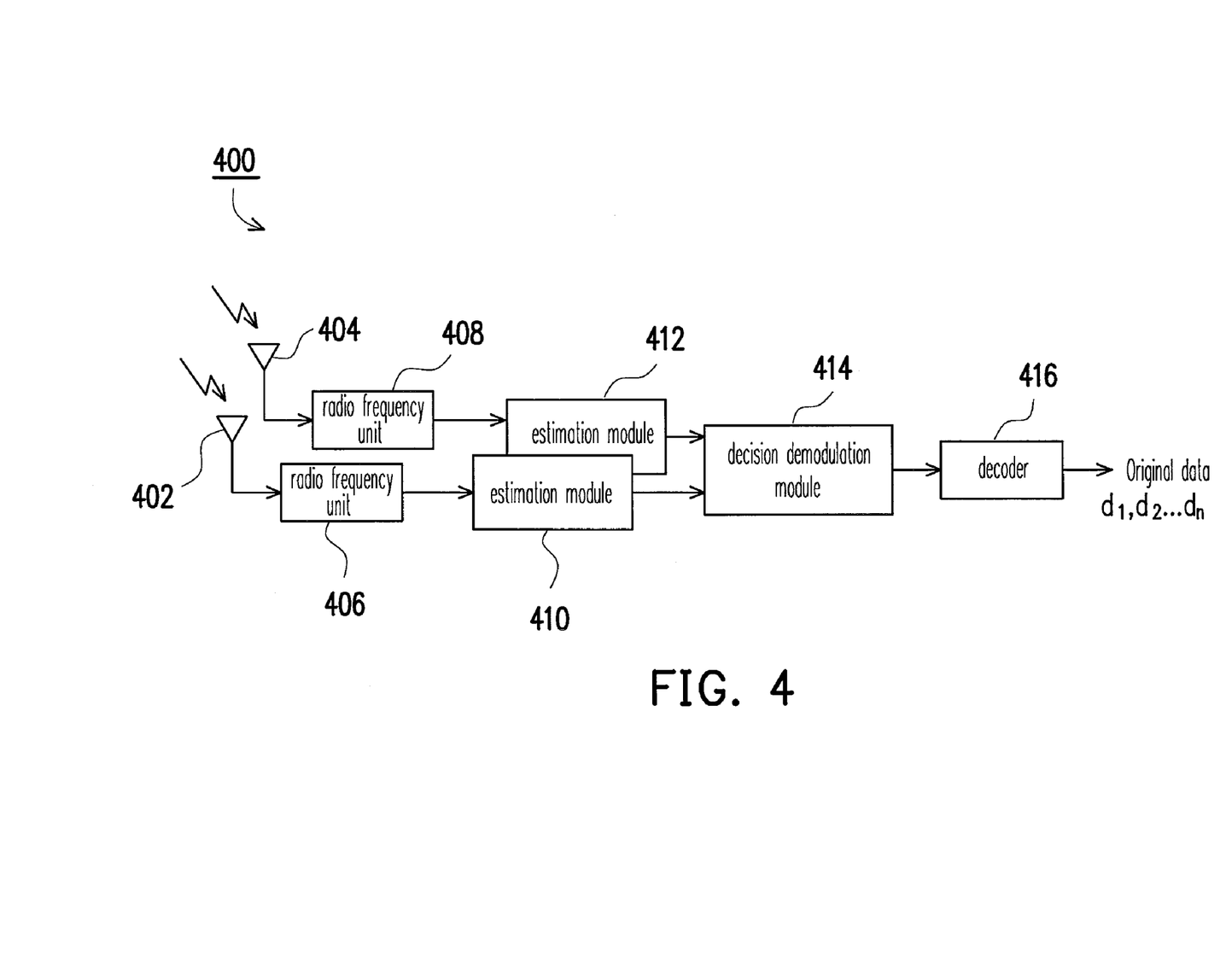
FIG. 4 is a functional block diagram of a receiver having multi-input according to a preferred embodiment of the present invention.

FIG. 4 is a functional block diagram of a receiver having multi-input according to a preferred embodiment of the present invention, which is also adapted to the MIMO-CDMA wireless communication equipment. Referring to FIG. 4, the receiver of the present invention includes a plurality of receiving antennas correspondingly coupled to a radio frequency unit respectively. For example, in the receiver 400, the receiving antennas 402, 404 are coupled to the radio frequency units 406, 408 respectively. And each of the radio frequency units is coupled to an estimation module, for example, the radio frequency units 406, 408 coupled to the estimation modules 410, 412 respectively. The outputs of all estimation modules will be coupled to a decision demodulating module 414, and the output of the decision demodulating module 414 is sent to a decoder 416.

Still referring to FIG. 4, the receiving antennas 402, 404 are used for receiving, for example, frame data sent by the transmitter 100 of FIG. 1, and each of the receiving antennas corresponds to a transmitting antenna. Taking the receiving antenna 402 as an example, the antenna will reducing the frame data to the base frequency signal through the radio frequency unit 406 after receiving the frame data, and then send it to the estimation module 410 to be processed.

Figure 5:
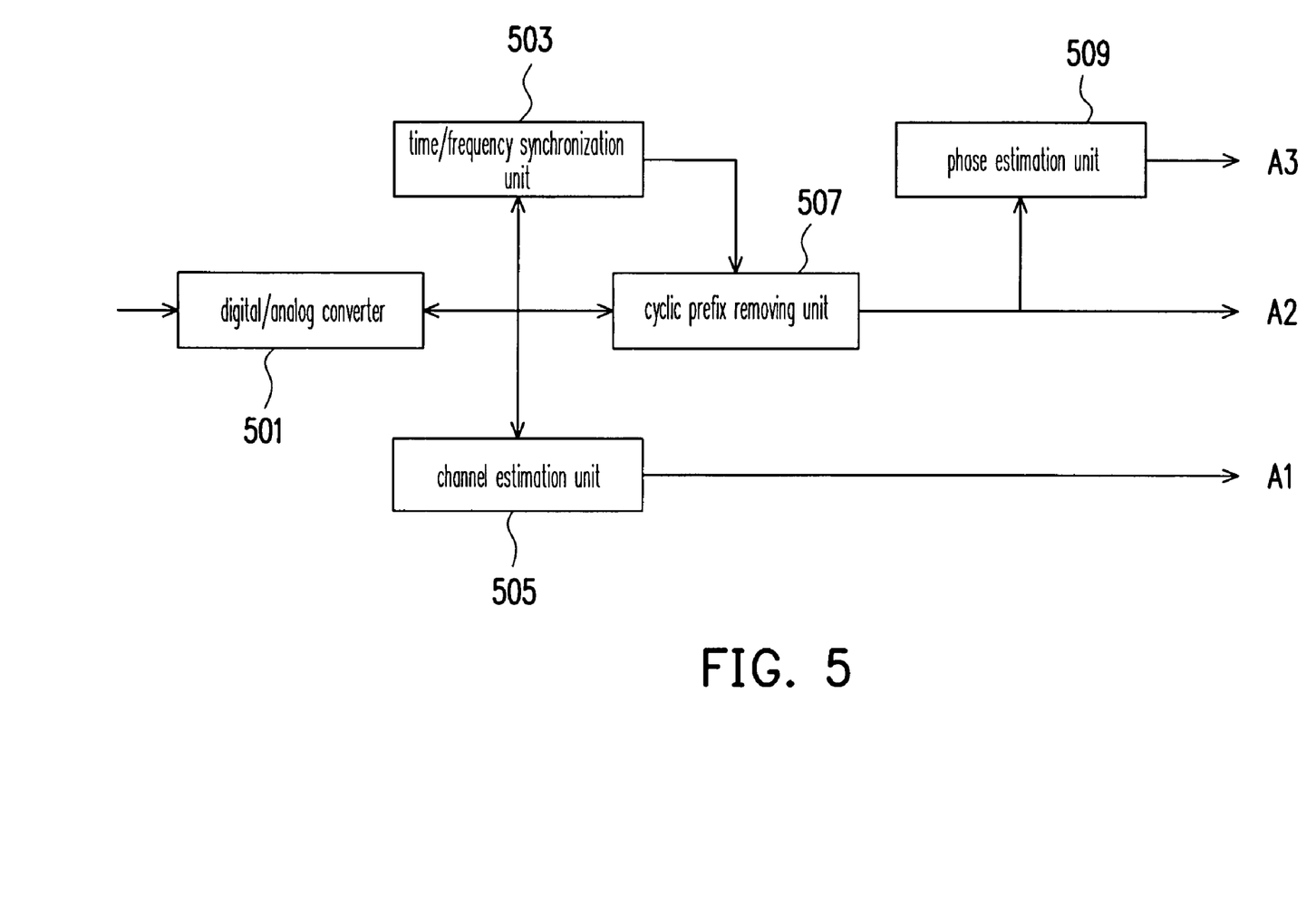
FIG. 5 is a circuit block diagram of an estimation module according to a preferred embodiment of the present invention.

FIG. 5 is a circuit block diagram of an estimation module according to a preferred embodiment of the present invention. Referring to FIG. 5, the estimation units 410, 412 in FIG. 4 can include, as shown in FIG. 5, a analog/digital converter 501, a time/frequency synchronization unit 503, a channel estimation unit 505, a cyclic prefix removing unit 507, and a phase estimation unit 509.

Referring to FIGS. 4 and 5, for example, when the output of the radio frequency unit 406 is sent to the estimation module 410, the analog/digital converter 501 in the estimation module 410 will convert the output to digital signal at first, and then send it to the time/frequency synchronization unit 503, the channel estimation unit 505 and the cyclic prefix removing unit 507. The time/frequency synchronization unit 503 will estimate the time and frequency parameters of the data frame received by the receiving antenna 402 based on the above preamble codes, and then send the output to the cyclic prefix removing unit 507 to remove the cyclic prefix. Furthermore, the channel estimation unit 505 estimates the channel parameter of the data frame based on the preamble codes, and the output A1 thereof is sent to the decision demodulation unit 414.

After the cyclic prefix removing unit 507 removes the cyclic prefix of the data frame, it also sends the output A2 thereof to the decision demodulating module 414. Moreover, the phase estimation unit 509 will estimate the phase of the output of the cyclic prefix removing unit 507 based on the above pilot codes, and the output A3 thereof is also coupled to the decision demodulation unit 414.

Although a estimation module 410 is taken as an example in the above description, it is known to those skilled in the art that the estimation module 412 can also be used.

Figure 6:
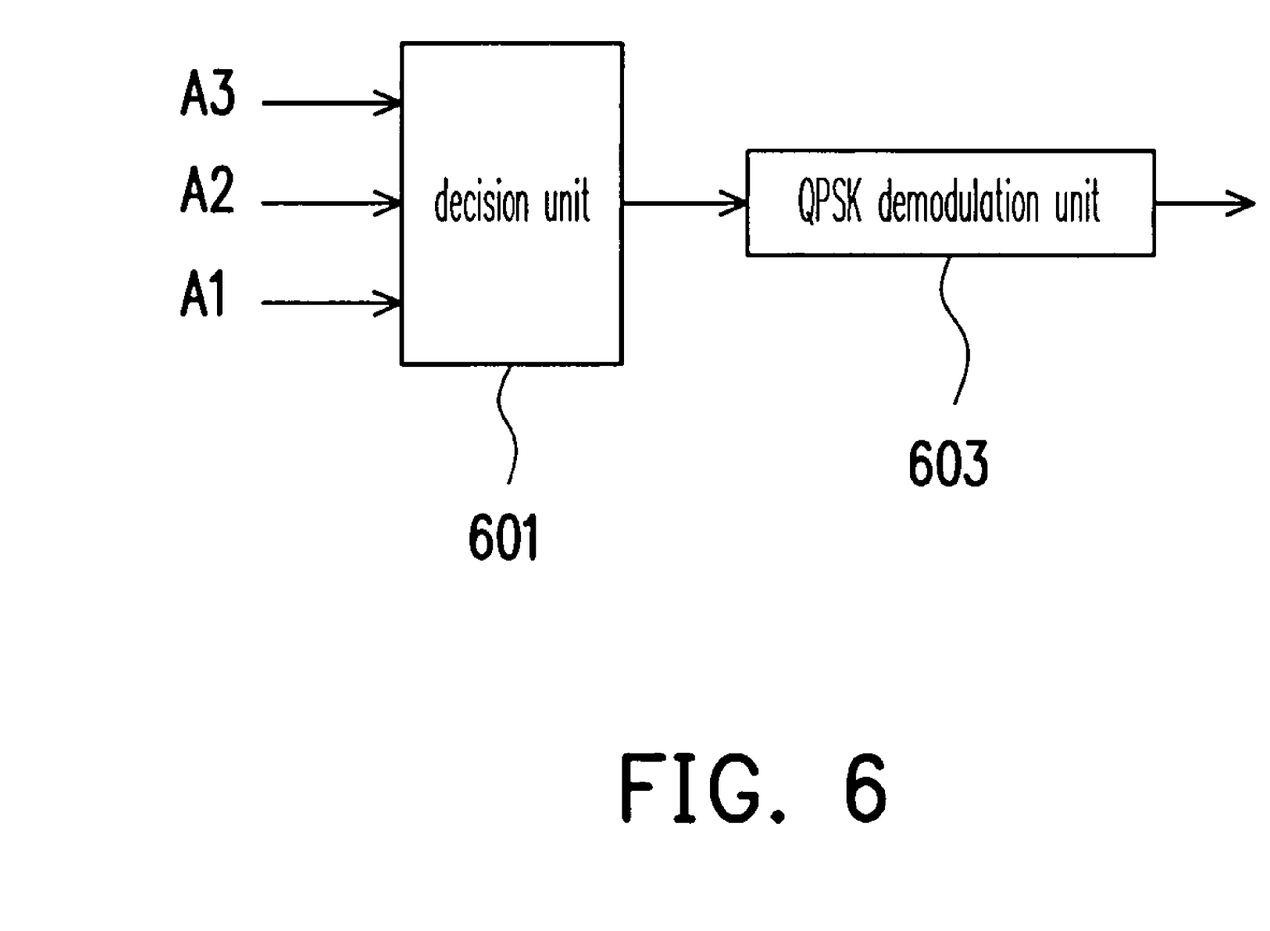
FIG. 6 is a circuit block diagram of a decision demodulating module according to a preferred embodiment of the present invention.

FIG. 6 is a circuit block diagram of a decision demodulating module according to a preferred embodiment of the present invention, which is adapted to the decision demodulating module 414 of FIG. 4. Referring to FIGS. 4 and 6, the decision demodulating module 414 can include a decision unit 601 and a QPSK demodulation unit 603. When the outputs A1, A2 and A3 of the estimation module are sent to the decision demodulating module 414, the decision unit 601 will spread and compensate the outputs A1, A2 and A3 of the estimation module, and conduct space-time block decoding. Contrarily, in other embodiments, if the STBC unit 106 in the transmitter 100 of FIG. 1 is replaced by the space decoder, the decision unit 601 conducts interference elimination instead of space-time block decoding.

Although a estimation module 410 is taken as an example in the above description, it is known to those skilled in the art that the estimation module 412 can also be used.

Figure 7:
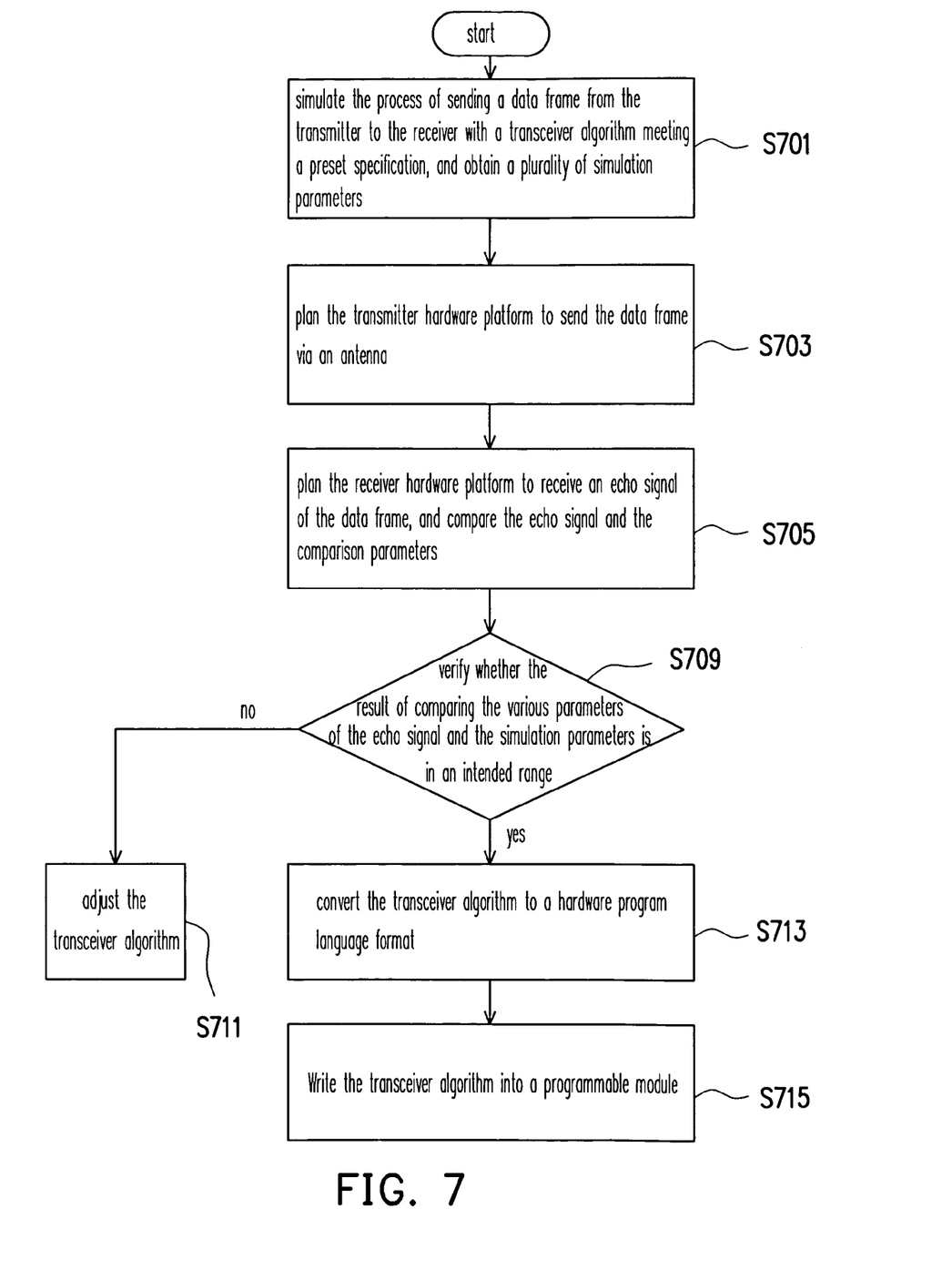
FIG. 7 shows a flow chart of a pre-verifying method for software/hardware design of communication system according to a preferred embodiment of the present invention.

In order to verify the correctness of the communication system consisting of the transmitter 100 and the receiver 400 of the FIGS. 1 and 4, the present invention further provides a pre-verifying method for software/hardware design of communication system, as shown in FIG. 7. Referring to FIG. 7, when a communication system having a transmitter and a receiver is to be designed, a transceiver algorithm is firstly designed according to a preset specification. In the present embodiment, the developers can design the transceiver algorithm with MATLAB software.

Then, the output of the decision unit 601 will be sent to the QPSK demodulation unit 603, to convert the output of the decision unit 601 back to the QPSK symbol. Then, the output of the QPSK demodulation unit 603 will be sent to the decoder 416 to revert the original transmission data $d_1$, $d_2, \ldots, d_n$.

1. Simulating the state of the transmitter: an encoded spreading signal having QPSK modulation is generated with MATLAB Comm. Tool Box, and after the simulated base frequency signal is sampled and pulse shaped, the transmission signal of band-pass radio frequency is simulated under the equivalent base frequency I/Q model.

2. Simulating the channel environment: in order to simulate the possible situation in real environment, the transmission signal is added with channel effect including Additive White Gaussian Noise channel (AWGN Channel) effect and Rayleigh Fading channel effect. Moreover, in order to simulate the real transceiver, the effect of frequency offset between the oscillators of the transmitter and the receiver and the simulation of the signal propagation delay between the transmitter and the receiver are also added in the present invention.

3. Simulating the state of the receiver: simulate the echo signal influenced by the channel, and process the synchronization estimation and compensation with the de-spread technique of the above preamble codes and the pilot code, thereby decoding to revert original signal.

After the step S701 is completed, the present invention proceeds to step S703, that is, planning the transmitter hardware platform, to actually send out the data frame via an antenna. Then, as described in step S705, plan the receiver hardware platform to receive the echo signal of the data frame sent by the transmitter, and compare each of the parameters of the echo signal and the above simulation parameters, so as to verify whether the result of comparing each of the parameters of the echo signal and the above simulation parameters is in an desired range or not, as described in step S709.

When the result of comparing each of the parameters of the echo signal and the above simulation parameters does not fall in an desired range ("NO" indicated in step S709), the content of the above transceiver algorithm needs to be adjusted such that it can meet the desired better effect, as described in step S711.

Contrarily, When the result of comparing each of the parameters of the echo signal and the above simulation parameters fall in the desired range ("YES" indicated in step S709), the transceiver algorithm is converted to a hardware language, e.g. Verilog or VHDL and the like as described in step S713, such that it can be written into a programmable module to perform the action of the transmitter and the receiver as described in step S715.

Figure 8:
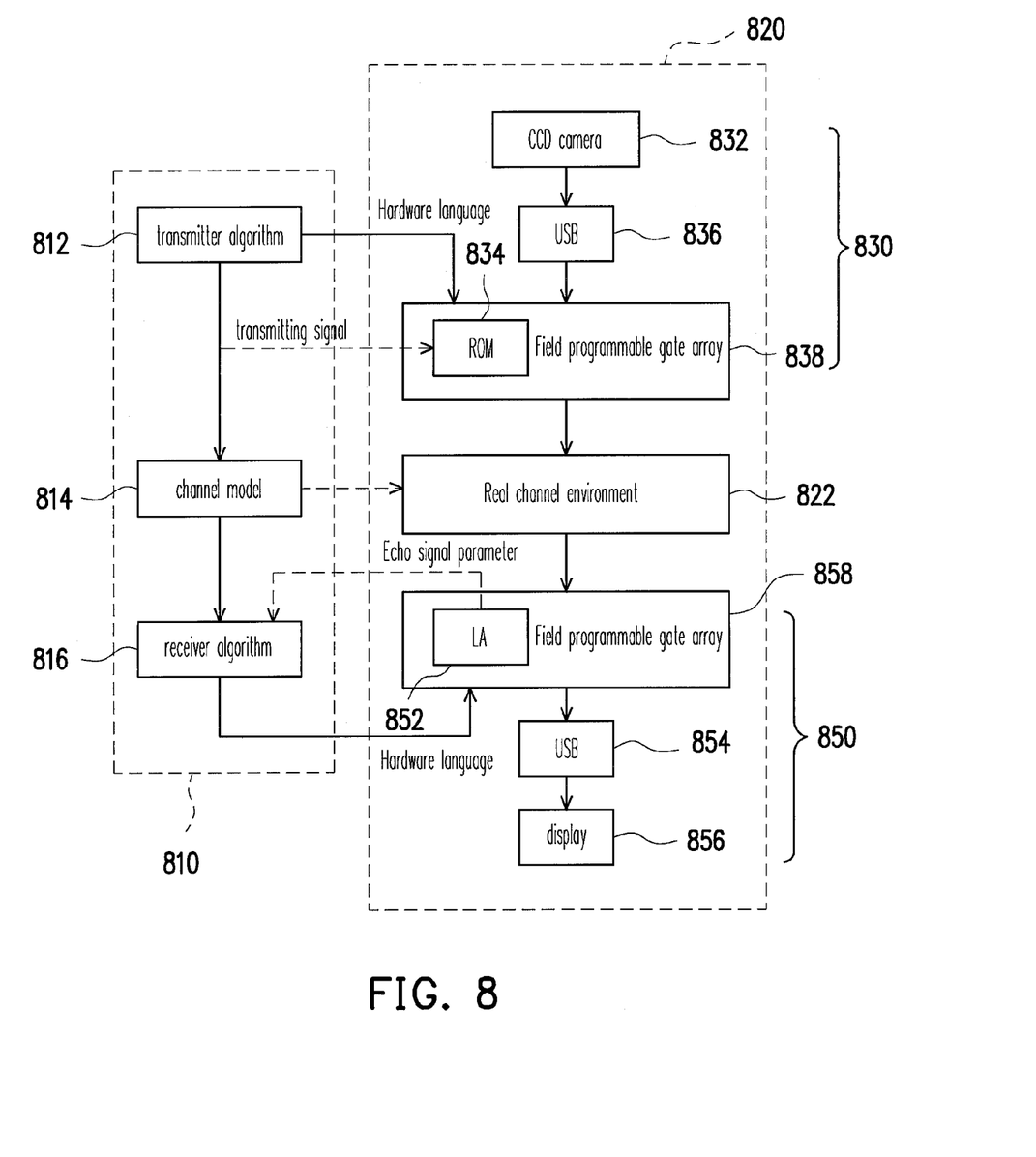
FIG. 8 shows a verifying system for software/hardware design of communication system meeting the verifying method of FIG. 7.

FIG. 8 shows a verifying system for software/hardware design of communication system meeting the verifying method of FIG. 7. Referring to FIGS. 7 and 8, in FIG. 8, a system simulation part 810 and a hardware part 820 are included. The system simulation part 810 described in step S701 includes a transmitter algorithm 812 for simulating transmitter state, a channel model 814 for simulating real channel state, and a receiver algorithm 816 for simulating receiver state. And the simulation manner of these systems has been described above, and will not be described herein again.

In the hardware part 820, a transmitter hardware platform 830 and a receiver hardware platform 850 are included. The transmitter hardware platform 830 includes a charge coupled device (CCD) camera 832 for capturing image information. Furthermore, a read only memory (ROM) 834 can also be included in the transmitter hardware platform 830, to store the transmission signal meeting the preset specification.

After the transceiver hardware platform is activated, the transmitter hardware platform 830 will send the transmission signal stored in the ROM 834 in form of data frame to the receiver hardware platform 850 via a real channel environment.

After the receiver hardware platform 850 receives the echo signal of the data frame, a logic analyzer (LA) 852 will capture the digital signal, and various parameters of the digital signal are then analyzed under the MATLAB environment. Then these parameters are compared with the various parameters generated by the system simulation part 810 to be the reference of the adjustment by the developers.

After the transceiver hardware platform is activated, the transmitter hardware platform 830 will send the transmission signal stored in the ROM 834 in form of data frame to the receiver hardware platform 850 via a real channel environment 822.

In view of the above, the present invention can capture real-time dynamic image with a CCD camera 832, and then send the image information in form of data frame through a USB 836 via a real channel environment 822 to the receiver to be processed. The image information is displayed on the display 856 through a USB 854 to realize a verifying scheme using comparison between the software and hardware, such that the communication system developed by the developers can be verified rapidly and correctly.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A multiple-input multiple-output code division multiple access (MIMO-CDMA) wireless communication equipment, comprising a transmitter and a receiver, wherein the transmitter comprises:
   an encoder for receiving a plurality of transmission data and encoding them;
   a quadrature phase-shift keying (QPSK) unit for conducting QPSK modulating to an output of the encoder;
   a space-time block coding (STBC) unit for conducting space-time coding to an output of the QPSK unit;
   a preamble code spreading unit for generating a plurality of preamble codes;
   a plurality of data frame generating modules for generating a data frame based on the outputs of the STBC unit and the preamble code spreading unit, a pilot code and a cyclic prefix; and
   a plurality of transmitting antennas coupled to the corresponding data frame generating modules respectively,
   wherein each of the data frame generating modules sends the generated data frame to the receiver via a corresponding transmitting antenna.

2. The MIMO-CDMA wireless communication equipment as claimed in claim 1, wherein each of the data frame generating modules comprises:
   a data spreader for spreading the output of the STBC unit, generating a payload data after being added with the cyclic prefix and the pilot codes;
   a multiplexer for receiving the payload data and the output of the preamble code spreading unit to output the data frame;
   a digital/analog converter for receiving an output of the multiplexer, and converting it to an analog signal; and
   a first radio frequency unit for sending the analog signal generated by the digital/analog converter to the receiver via a corresponding transmitting antenna.

3. The MIMO-CDMA wireless communication equipment as claimed in claim 2, wherein the data spreader comprises:
   a data spreading unit for spreading an output of the QPSK unit;
   a cyclic prefix generating unit for receiving an output of the data spreading unit, and outputting the output of the data spreading unit after being added with the cyclic prefix;
   a pilot codes generating unit for generating the pilot code; and
   an adder for adding the pilot code to the output of the cyclic prefix generating unit to generate the payload data.

4. The MIMO-CDMA wireless communication equipment as claimed in claim 1, wherein the receiver comprises:
   a plurality of receiving antennas for receiving the data frame sent by the corresponding transmitting antennas respectively;
   a plurality of second radio frequency units coupled to the corresponding receiving antennas respectively, and conducting frequency reducing to the data frame received by the receiving antenna;
   a plurality of estimation modules coupled to the corresponding second radio frequency units, for estimating a time parameter, a frequency parameter and a channel parameter of the frequency reduced data frame, and removing the cyclic prefix;
   a decision demodulating module for receiving the outputs of the estimation modules, to conduct data spreading and space-time block decoding to the data frame passed through the estimation modules; and
   a decoder for receiving the outputs of the decision demodulating module, to revert the original transmission data.

5. The MIMO-CDMA wireless communication equipment as claimed in claim 4, wherein each of the estimation modules comprises:
   an analog/digital converter for converting the data frame received by the corresponding second radio frequency unit into a digital signal;
   a time/frequency synchronization unit for conducting the time parameter estimating and the space parameter estimating to the digital data frame output by the analog/digital converter based on the preamble codes;
   a channel estimation unit for conducting channel estimating to the digital data frame output by the analog/digital converterbased on the preamble codes, and sending the estimation result to the decision demodulating module;
   a cyclic prefix removing unit for removing the cyclic prefix in the digital data frame output by the analog/digital converter based on the time parameter and the space parameter, and sending it to the decision demodulating module; and
   a phase estimation unit for receiving an output of the cyclic prefix removing unit, to conduct phase estimating to the data frame with the cyclic prefix removed based on the pilot code, and sending the estimation result to the decision demodulating module.

6. The MIMO-CDMA wireless communication equipment as claimed in claim 4, wherein the decision demodulating module comprises:
   a decision unit for conducting data spreading and space-time block decoding to an output of the estimation module; and
   a QPSK demodulation unit for conducting QPSK demodulating to an output of the decision unit, and sending it to the decoder.

7. A MIMO-CDMA wireless communication equipment, comprising a transmitter and a receiver, wherein the transmitter comprises:
   an encoder for receiving a plurality of transmission data and encoding them;
   a QPSK unit for conducting QPSK modulating to an output of the encoder;
   a space multiplexer for conducting space coding to an output of the QPSK unit;
   a preamble code spreading unit for generating a plurality of preamble codes;
   a plurality of data frame generating module for generating a data frame based on the outputs of the space multiplexer and the preamble code spreading unit, a pilot code and a cyclic prefix; and
   a plurality of transmitting antennas coupled to the corresponding data frame generating modules respectively,
   wherein each of the data frame generating modules sends the generated data frame to the receiver via a corresponding transmitting antenna.

8. The MIMO-CDMA wireless communication equipment as claimed in claim 7, wherein each of the data frame generating modules comprises:
   a data spreader for spreading the output of the space multiplexer, to generate a payload data after being added with the cyclic prefix and the pilot codes;
   a multiplexer for receiving the payload data and the output of the preamble code spreading unit, to output the data frame;
   a digital/analog converter for receiving an output of the multiplexer, and converting it to an analog signal; and
   a first radio frequency unit for sending the analog signal generated by the digital/analog converter to the receiver via a corresponding transmitting antenna.

9. The MIMO-CDMA wireless communication equipment as claimed in claim 8, wherein the data spreader comprises:
   a data spreading unit for spreading an output of the QPSK unit;
   a cyclic prefix generating unit for receiving an output of the data spreading unit, and outputting the output of the data spreading unit after being added with the cyclic prefix;
   a pilot codes generating unit for generating the pilot code; and
   an adder for adding the pilot code to the output of the cyclic prefix generating unit to generate the payload data.

10. The MIMO-CDMA wireless communication equipment as claimed in claim 7, wherein the receiver comprises:
    a plurality of receiving antennas for receiving the data frame sent by the corresponding transmitting antennas respectively;
    a plurality of second radio frequency units coupled to the corresponding receiving antennas respectively, and conducting frequency reducing to the data frame received by the receiving antenna;
    a plurality of estimation modules coupled to the corresponding second radio frequency units, for estimating a time parameter, a frequency parameter and a channel parameter of the frequency reduced data frame, and removing the cyclic prefix;
    a decision demodulating module for receiving the outputs of the estimation modules, to conduct data spreading and interference eliminating to the data frame passed through the estimation modules; and
    a decoder for receiving the outputs of the decision demodulating module, to revert the original transmission data.

11. The MIMO-CDMA wireless communication equipment as claimed in claim 10, wherein each of the estimation modules comprises:
    an analog/digital converter for converting the data frame received by the corresponding second radio frequency unit into a digital signal;
    a time/frequency synchronization unit for conducting the time parameter estimating and the space parameter estimating to the digital data frame output by the analog/digital converterbased on the preamble codes;
    a channel estimation unit for conducting channel estimating to the digital data frame output by the analog/digital converter based on the preamble codes, and sending the estimation result to the decision demodulating module;
    a cyclic prefix removing unit for removing the cyclic prefix in the digital data frame output by the analog/digital converter based on the time parameter and the space parameter, and sending it to the decision demodulating module; and
    a phase estimation unit for receiving an output of the cyclic prefix removing unit, to conduct phase estimating to the data frame with the cyclic prefix removed based on the pilot code, and sending the estimation result to the decision demodulating module.

12. The MIMO-CDMA wireless communication equipment as claimed in claim 10, wherein the decision demodulating module comprises:
    a decision unit for conducting data spreading and interference eliminating to an output of the estimation module; and
    a QPSK demodulation unit for conducting QPSK demodulating to an output of the decision unit, and sending it to the decoder.

* * * * *